United States Patent Office 3,137,612
Patented June 16, 1964

3,137,612
SYNTHETIC LAMINATE WITH ARC
RESISTANT PROPERTIES
Chien Fan Chu, Melrose Park, and Robert C. Medl, Evanston, Ill., assignors to The Richardson Company, Melrose Park, Ill., a corporation of Ohio
No Drawing. Filed Apr. 22, 1960, Ser. No. 23,924
3 Claims. (Cl. 161—162)

This invention is concerned with synthetic laminates having improved arc resistant properties formed from fibrous fillers impregnated with thermosetting resins.

Synthetic laminates have become widely accepted in the electrical and electronics industries as support for components and as insulation media. Such laminates are normally formed by impregnating a fibrous filler sheet with a thermosetting resin, followed by superimposing a plurality of such impregnated sheets and subjecting the assembly to heat and pressure to cure the resin and consolidate the assembly into a hard, integral, board-like product.

One of the more commonly used impregnating resins are the phenolic resins. These resins normally comprise the condensation product of an aldehyde, such as formaldehyde with a phenolic component from the class consisting of phenol, cresols and xylenols or mixtures thereof. Fillers are usually fibrous in nature and are either paper, canvas or linen sheets, the latter two fillers being predominant in the better grade laminates requiring higher physical properties. In addition to cellulosic fiber fillers, other synthetic fiber fillers are sometimes used, such as glass, nylon or the like.

In general, phenolic resins have been found adequate to meet most of the electrical and physical requirements for laminates. However, under the more stringent conditions that have been adopted within recent years, for example, high voltages, continual improvements are required for synthetic laminates to meet these conditions.

One increasingly important property of laminates is that of arc resistance or resistance to arc tracking. If an insulation medium has poor arc resistance, the presence of high voltages between circuit elements attached to the insulation medium will result in a breakdown of the insulation and the creation of an electrically conductive path between elements. Additionally, the breakdown of insulation in this manner may also create a serious fire hazard. Accordingly, improvements in resistance to arc tracking is constantly being considered. Several proposals have been made in the prior art having as their object the improvement of arc resistance, as is evidenced by the patents to Hill, 2,439,929, and Kehe, 2,781,076. In brief, both of these patents contemplate improving arc resistance by using melamine formaldehyde resins, particularly on the surface of the laminates.

The present invention has as one of its main objects a method for improving arc resistance of laminates while maintaining, for the most part, electrical and physical properties normally required of such laminates.

Another object is to provide a laminate having improved arc resistance wherein the improvement is obtained at relatively negligible costs.

The foregoing objects are accomplished by incorporating particles of aluminum hydroxide in the resinous varnish used to impregnate a filler sheet. In brief, the present invention contemplates initially forming an impregnating resinous varnish from a partially condensed resin, for example, phenolic aldehydes, such as phenol, cresol or xylenol formaldehydes, using as a solvent, preferably, an alcohol-water mixture. To this impregnating varnish there is added particulate aluminum hydroxide, the mixture being thoroughly agitated or worked so as to form a substantially homogeneous suspension of the particles of aluminum hydroxide in the impregnating varnish. The mixing operation can be performed with a variety of equipment, although at present it has been found preferable to use a pebble mill of the type which is frequently used in the paint industry.

After the impregnating suspension has been formed, a filler sheet is then passed through the varnish and coated to the desired degree, followed by drying at elevated temperatures, generally in the area of about 260–320° F., wherein volatiles are removed.

In the usual commercial operation, the filler sheet is supplied from a roll and, accordingly, after impregnation and drying, the impregnated sheet is cut up into smaller sizes of desired dimensions which are then assembled to form a laminate. Thus, a plurality of impregnated sheets are superimposed forming an assembly and the assembly is cured in a laminating press, generally using between 900–1500 p.s.i. for periods of 60–120 minutes and at temperatures of about 275–320° F. It will be appreciated that the particular resin and filler stock together with the thickness of the laminae assembly will, for the most part, determine the particular pressures, temperatures and times of pressing to be used within the foregoing limits.

Synthetic laminates made using primarily phenolic resins generally have been characterized by erratic arc resistant values ranging from 0–90 seconds, as determined by ASTM arc resistant Test No. D495–48T. Using the same test for laminataes made in accordance with the present invention, it has been found that such laminates have arc resistance values of a minimum of 125 seconds and usually between 140–155 seconds.

The amount of aluminum hydroxide used may be within a range of 50–200 parts per 100 parts of resin, but is preferably within the range of 75–125 parts based on 100 parts of phenolic resin solids or approximately 25–40% of aluminum hydroxide by weight based on the total weight of hydroxide and resin plus paper. Further, it has been found preferable to use an aluminum hydroxide particle size wherein the average maximum diameter is between about .04–.10 micron with a preferred average of about .06 micron, as determined by the average number particle diameter method.

As further illustrating the invention, but without intending to limit the same, the following examples are presented of laminates made using the principles of the present invention:

| Examples | 1 | 2 | 3 | 4 |
|---|---|---|---|---|
| Resin (Parts) | 100 | 100 | 100 | 100 |
| Al(OH)$_3$ (Parts) | 0 | 75 | 100 | 125 |
| Arc Resistance | 79.9 | 145.7 | 145.2 | 152.1 |

In each of the above examples, the filler consisted of Buckeye Cellulose Corporation BC-10 paper and the resin consisted of a condensation product of formaldehyde with equal parts of phenol and cresylic acid, with the resultant varnish being made using a substantially equal mixture of alcohol and water as a solvent. Sufficient resin-impregnated sheets, in each instance, were assembled to provide a final laminate of one-sixteenth of an inch thick. Each laminate assembly was cured and formed in a standard laminating press using an hydraulic pressure of about 1000 p.s.i. at a temperature equivalent to 40# steam (285° F.) with a press time of approximately 90 minutes. Arc resistance was determined by the aforementioned ASTM Test No. D495–48T.

It is to be noted that in Example 1, wherein aluminum hydroxide was not incorporated into the impregnating varnish, that the arc resistance was well below 100 seconds. This is to be compared with Examples 2, 3 and 4 incorporating aluminum hydroxide in the impregnating varnish wherein each of the laminates had an arc resistance of better than 140.

Having described certain exemplary embodiments of the invention, the same is intended to be limited only by the scope of the following claims.

We claim:

1. A laminate having a minimum arc resistance of about 125 seconds as determined by ASTM Test No. D495–48T comprising as an integral assembly a plurality of superimposed cellulosic fiber filler sheets impregnated with a thermosetting resinous phenolic aldehyde condensation product cured to a hard infusible state, said resin containing uniformly dispersed therein between about 75–125 parts based on 100 parts of resin of a finely divided aluminum hydroxide having a particle size within the range of about .04 to .10 micron.

2. A laminate as described in claim 1 wherein the filler sheets are paper.

3. A laminate as described in claim 2 wherein the average particle size of said aluminum hydroxide is about .06 micron.

References Cited in the file of this patent

UNITED STATES PATENTS

| | | |
|---|---|---|
| 1,160,362 | Baekeland | Nov. 16, 1915 |
| 2,162,890 | Horne et al. | June 20, 1939 |
| 2,594,873 | Clark | Apr. 29, 1952 |
| 2,680,102 | Becher | June 1, 1954 |
| 2,781,076 | Kehe | Feb. 12, 1957 |
| 2,997,527 | Kessel et al. | Aug. 22, 1961 |

FOREIGN PATENTS

| | | |
|---|---|---|
| 785,731 | Great Britain | Nov. 6, 1957 |